United States Patent [19]

Merle

[11] Patent Number: 4,571,655
[45] Date of Patent: Feb. 18, 1986

[54] MAGNETIC CASSETTE WITH FLOATING AND AUXILIARY TENSIONING ROLLERS

[75] Inventor: Jean-Pierre Merle, Clamart, France

[73] Assignee: ENERTEC, Montrouge, France

[21] Appl. No.: 419,356

[22] Filed: Sep. 17, 1982

[30] Foreign Application Priority Data

Sep. 30, 1981 [FR] France ............... 81 18488

[51] Int. Cl.$^4$ ............. G11B 23/02; G11B 5/008; G11B 15/32; G03B 1/04
[52] U.S. Cl. ............. 360/132; 360/96.1; 360/93; 242/197; 242/199
[58] Field of Search ......... 360/132, 134, 96.1, 360/93; 242/199, 192, 200, 205, 197; 474/101, 134, 137

[56] References Cited

U.S. PATENT DOCUMENTS

| | | | |
|---|---|---|---|
| 601,110 | 3/1898 | Wilson | 474/134 |
| 3,342,632 | 9/1967 | Bate et al. | 360/134 |
| 3,666,203 | 5/1972 | Sato et al. | 360/132 |
| 3,802,644 | 4/1974 | Maiershofer | 242/192 |
| 3,907,230 | 9/1975 | Merle et al. | 360/132 |
| 4,102,516 | 7/1978 | Anglin et al. | 360/132 |
| 4,146,194 | 3/1979 | Majicek | 360/132 |
| 4,159,811 | 7/1979 | Grant | 242/192 |
| 4,162,774 | 7/1979 | Bowers | 360/132 |
| 4,205,808 | 6/1980 | Hurtig et al. | 242/192 |
| 4,219,169 | 8/1980 | Majicek | 360/132 |
| 4,335,857 | 6/1982 | Pfost et al. | 242/199 |

FOREIGN PATENT DOCUMENTS

| | | | |
|---|---|---|---|
| 1118485 | 11/1961 | Fed. Rep. of Germany . | |
| 1427665 | 1/1966 | France . | |
| 2301471 | 9/1976 | France . | |
| 55-97046 | 7/1980 | Japan | 242/192 |
| 0860272 | 1/1961 | United Kingdom | 242/192 |
| 584334 | 8/1975 | U.S.S.R. | 360/132 |

Primary Examiner—Stuart N. Hecker
Assistant Examiner—Alfonso Garcia

[57] ABSTRACT

In a magnetic tape cassette having an elastic belt for maintaining the tension of the tape, a second, curved roller is provided between the belt and the floating roller which presses the belt against the tape reels. The two rollers are mounted on a common semi-restrained slidable support plate. The pressure exerted on the second curved roller is transferred to the floating roller by the plate, while the second curved roller, which is bi-conical, maintains the height of the belt even when the tape is repeatedly wound and rewound over a short section of its length.

7 Claims, 3 Drawing Figures

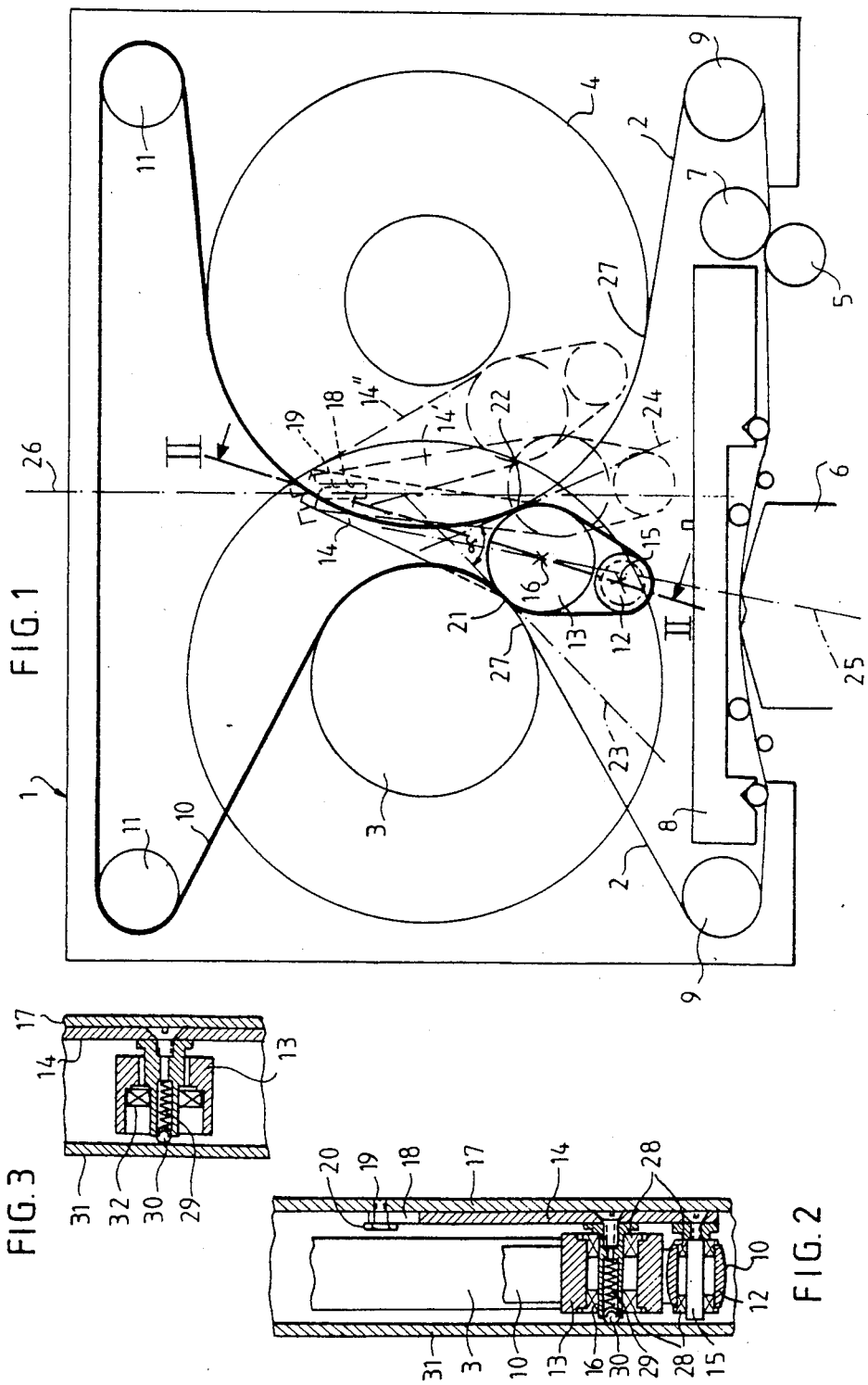

MAGNETIC CASSETTE WITH FLOATING AND AUXILIARY TENSIONING ROLLERS

The present invention relates to a magnetic tape cassette of the type comprising two reels for carrying a magnetic tape, means for guiding the magnetic tape in front of a read-write device, means for driving the magnetic tape, a tension control arrangement comprising a cylindrical floating roller urged against the two reels by means of an endless elastic belt extending under tension between the floating roller and at least one return roller and embracing part of the periphery around each of the reels, the magnetic tape winding and unwinding tangentially on each reel respectively upstream and downstream of the lines of contact of the floating roller on the two reels.

A cassette of this type is described in U.S. Pat. No. 3,907,230, incorporated herein by reference, in the name of the Applicant. Reference may be made to that specification for a complete understanding to the function of the belt, which, by a complex differential elongation effect assures tensioning of the tape.

When such a cassette is used in circumstances such that the tape is subjected to frequent wind and rewind over a small portion of its length, between the two reels, the tension belt drifts in height on the floating roller, there being nothing to restrain it.

It is an object of this invention to alleviate this inconvenience and thus provide a cassette having an improved stability in height of the belt in wind and rewind use.

According to this invention, at least one curved roller is disposed between the floating roller and the belt, tension coupling means being provided such that the tension exerted by the belt on the curved roller is substantially completely transmitted to the floating roller which divides it between each of the two reels.

The stabilising action of a curved roller is in itself known, but the invention has the merit of making it apparent that it is possible to include a curved roller satisfying these requirements despite the complex (and in any case non-circular) path of the floating roller.

Advantageously the said tension coupling means comprises a common rigid, mobile support for the axes of the floating and curved rollers, this support being arranged to follow the movement of the floating roller and having a device for defining at each instant the position of the support as a function of the position of the floating roller.

Preferably the support is a plate arranged to slide on the base of the cassette, carrying the axes of the floating and curved rollers, and having a guide slot in which there is disposed a nipple secured to the bottom of the cassette to define the position of the support as a function of the position of the floating roller.

Advantageously the plate is retained on the bottom of the cassette by means of a resilient support device.

Such a support plate provides a solution which is ingenious and simple in execution to the problem of the substantially complete coupling of the tension exerted by the belt on the curved roller to the floating roller, in every position of the floating roller.

A cassette in accordance with this invention will now be described, by way of example, with reference to the accompanying drawing, in which:

FIG. 1 is a schematic plan view of the cassette (with the cover omitted);

FIG. 2 is a section along the line II—II of FIG. 1, showing the support for the floating and curved rollers; and FIG. 3 shows a modification to the mounting of the floating roller of FIG. 2.

FIG. 1 shows a cassette 1 in which the magnetic tape 2 is wound from a reel 3 on to a reel 4, or vice-versa, by means of a drive roller 5 belonging to a read-write device in which the cassette is inserted. The tape 2, which is pressed between a pinch roller 7 and the drive roller 5, and moved by this latter, extends in front of a magnetic head 6 belonging to the read-write device.

Means 8 associated with rollers 9 enables the magnetic tape 2 to be guided in front of the read-write device 5, 6.

An arrangement for control of the tape tension comprises an elastic belt 10 extending around two return rollers 11, partially embracing the reels 3 and 4, and further extending round a curved roller 12 associated with a cylindrical floating roller 13 urged against the reels 3 and 4 by the elastic tension of the belt 10 exerted on the curved roller 12 and transmitted to the roller 13 via a common support 14 for the axes 15 and 16 of the curved and floating rollers 12 and 13.

The support 14 comprises an elongate plate sliding with minimum friction on the bottom 17 of the cassette 1. The position of the plate 14 is determined, on the one hand, by the position of the floating roller 13, (this latter position being a function of the winding of the tape), and, on the other hand, by an arrangement defining the path of the curved roller 12: this involves, in this case, a rectangular guide slot 18 provided at one end of the plate centred about the line II—II extending through the axes 15 and 16 of the curved and floating rollers 12 and 13, and disposed, relative to the floating roller 13, at the opposite end to the curved roller 12. A nipple 19 with a head 20 fixed to the bottom 17 of the cassette, on the median line indicated by 26, guides the slot 18 during movement of the floating roller 13. Two other positions 14' and 14" of the plate 14 are shown in dotted outline in FIG. 1.

This trajectory defining arrangement 18–19 on the one hand enables the natural trajectory of the floating roller 13 (a non-circular trajectory) to be followed, and not influence the overall value of the pressure exerted by the roller 13 on the reels 3 and 4, assuming that the friction of the plate 14 on the bottom 17 and the forces developed at the point of contact of the nipple 19 on the walls of the slot 18 are negligible relative to this pressure (as is the case in practice for a slot 18 centred on the line II—II).

On the other hand, by determining the orientation of the plate 14, the arrangement 18–19 defines the position of the curved roller 12, for each position of the floating roller 13, and, consequently, controls the division and orientation of the pressure forces exerted respectively on each reel 3 and 4 by the floating roller 13.

Rigourous analysis and even the modelling by calculation of the forces involved at the lines of contact 21 and 22 of the floating roller 13 with the reels 3 and 4 (the thickness of the belt 10 being neglected) appear extremely complex, owing to the fact that the forces developed by the elastic belt 10 depend on a multitude of parameters and are not well understood, notably as regards their dynamic behaviour.

Thus the choice of dimensions and of the trajectory imposed on the curved roller 12 by the arrangement of the support 14 depends largely on actual experiment with each type of cassette.

In general, it can be taken as a principle that, for all positions, the curved roller 12 is advantageously situated in the portion of the cassette located in the variable dihedral of angle alpha formed by the intersection of the planes represented by lines 23 and 24, these planes being respective common tangents of the floating roller 13 with the reels 3 and 4 (and again neglecting the thickness of the belt 10).

In fact it appears desirable, to transfer in relative equilibrium, the pressures of the belt on each of the two reels, that the axis 15 of the curved roller 12 should be kept in the vicinity of the plane bisecting (as shown by line 25) the dihedral of angle alpha. This is obviously only true if a sole curved roller 12 is used. However, it is possible to provide two or more curved rollers, (or even a curved roller and one or more cylindrical return rollers) cooperating with the floating roller 13 via a support 14; the position of these rollers can then be substantially symmetrical with reference to the bisecting plane of the line 25.

The exemplary embodiment of a cassette according to the invention, such as that shown in the accompanying drawings, has been found completely satisfactory.

The curved roller 12 (here a biconical roller) has a mean diameter substantially half the diameter of the floating roller 13, and has been mounted, on the plate 14, in the immediate vicinity of the pressure roller, the mean length of the arm between the axis 16 of the floating roller and the nipple 19 being about triple the interaxial distance separating the two rollers 12 and 13. It should however be understood that these proportions, which are not critical, are given only by way of example and should not be considered as limitative.

As regards the dimensions of the floating roller 13, these are limited on the one hand by the fact that the roller should not be able to pass between the two reels, and, on the other hand, by the fact that the magnetic tape 2 should wind and unwind tangentially on each reel (as at 27) respectively upstream and downstream of the lines of pressure (or of contact 22, 21) of the floating roller 13 on the two reels.

As shown in FIG. 2, the rollers 12 and 13 are mounted in known manner by means of bearings 28 on their respective axes 15 and 16. It should be noted that one of these axes, the axis 16 of the floating roller, is hollow and houses a spring 29 urging a ball 30 against the upper face 31 of the cassette, which ensures stability in height of the plate 14, and thus of the biconical roller 15, and in turn of the belt 10.

FIG. 3 shows a method of mounting the floating roller 13, in which the roller is mounted in known manner by means of a sole radial ball bearing 32 which allows the roller 13 a slight freedom to wobble. This ability to wobble enables the roller 13 to accommodate better any minor error in the repective positioning of the reels 3 and 4, while maintaining a virtually normal line of contact with them. This wobble mounting does not introduce any drift in the height of the belt 10 which continues to be stabilised by the curved roller 12.

I claim:

1. A cassette for magnetic tape, of the type comprising two reels for carrying a magnetic tape, means for guiding the magnetic tape in front of a read-write device, means for driving the magnetic tape, and means for tensioning the tape comprising a cylindrical floating roller urged against the two reels by means of an endless elastic belt extending under tension between the floating roller and at least one return roller and contacting a portion of the periphery around each of the reels, the magnetic tape winding and unwinding tangentially on each reel respectively upstream and downstream of the lines of contact of the floating roller on the two reels, the improvement comprising:
   at least one curved roller disposed between the floating roller and the belt;
   a common rigid support to which the floating and curved rollers are mounted at one end thereof; and
   means, disposed within the cassette and the end of the support opposite that of the curved roller, which means cooperate for enabling the support and floating and curved rollers to slidably and pivotally move relative to the cassette and reels,
   whereby the tension exerted by the belt on the curved roller is at least partially transmitted to the floating roller which divides it between each of the two reels.

2. A cassette according to claim 1, wherein the support is a plate arranged to slide on the bottom of the cassette, carrying the axes of the floating and curved rollers, and having a guide slot in which there is disposed a nipple secured to the bottom of the cassette to define the position of the support as a function of the position of the floating roller.

3. A cassette according to claim 2, wherein the plate is retained on the bottom of the cassette by means of a resilient support device.

4. A cassette according to claim 1, wherein the floating roller is mounted to wobble on the support.

5. A cassette according to claim 1, wherein the curved roller is at each instant situated in the portion of the cassette located in the dihedral of angle alpha formed by the respective common tangent planes of the floating roller with each of the two reels.

6. A cassette according to claim 5, wherein there is one curved roller which is mounted to the support such that a plane bisecting the dihedral of angle alpha intersects at least a portion of the curved roller.

7. A cassette according to claim 1, wherein the curved roller is biconical.

* * * * *